United States Patent
Balakrishna et al.

(10) Patent No.: US 7,739,403 B1
(45) Date of Patent: Jun. 15, 2010

(54) SYNCHRONIZING STATE INFORMATION BETWEEN CONTROL UNITS

(75) Inventors: Raghunath Balakrishna, San Jose, CA (US); Shine-chu Wang, Sunnyvale, CA (US); Umesh Krishnaswamy, Sunnvale, CA (US); Bharani Chadalavada, Santa Clara, CA (US); Sandeep Kumar, Santa Clara, CA (US); Raj Tuplur, Fremont, CA (US); Rajagopalan Sivaramakrishnan, Campbell, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1220 days.

(21) Appl. No.: 10/678,280

(22) Filed: Oct. 3, 2003

(51) Int. Cl.
G06F 15/173 (2006.01)
G06F 11/00 (2006.01)

(52) U.S. Cl. .............................. 709/242; 709/225; 714/4

(58) Field of Classification Search ................. 709/223; 714/4
See application file for complete search history.

(56) References Cited

U.S. PATENT DOCUMENTS

| | | | |
|---|---|---|---|
| 5,848,227 A | 12/1998 | Sheu | |
| 6,219,706 B1 * | 4/2001 | Fan et al. | 709/225 |
| 6,594,229 B1 | 7/2003 | Gregorat | |
| 6,633,544 B1 | 10/2003 | Rexford et al. | |
| 6,671,694 B2 | 12/2003 | Baskins et al. | |
| 6,751,191 B1 | 6/2004 | Kanekar et al. | |
| 6,799,319 B2 | 9/2004 | Van Loo | |
| 6,865,591 B1 * | 3/2005 | Garg et al. | 709/201 |
| 6,910,148 B1 * | 6/2005 | Ho et al. | 714/4 |
| 6,948,088 B1 | 9/2005 | Sharan | |
| 6,965,903 B1 | 11/2005 | Agarwal et al. | |
| 6,983,317 B1 * | 1/2006 | Bishop et al. | 709/223 |
| 7,076,555 B1 | 7/2006 | Orman et al. | |
| 7,076,696 B1 | 7/2006 | Stringer | |
| 7,096,383 B2 | 8/2006 | Talaugon et al. | |
| 7,111,035 B2 * | 9/2006 | McClellan et al. | 709/201 |
| 7,162,737 B2 * | 1/2007 | Syvanne et al. | 726/12 |
| 7,164,676 B1 | 1/2007 | Chakraborty | |
| 2002/0107966 A1 * | 8/2002 | Baudot et al. | 709/227 |
| 2003/0056138 A1 * | 3/2003 | Ren | 714/4 |
| 2003/0084371 A1 * | 5/2003 | Mongazon-Cazavet et al. | 714/13 |

(Continued)

OTHER PUBLICATIONS

U.S. Appl. No. 10/457,814, entitled "Managing State Information in a Computing Environment," by David M. Katz et al., filed Jun. 9, 2003.

*Primary Examiner*—William C Vaughn, Jr.
*Assistant Examiner*—Joiya M Cloud
(74) *Attorney, Agent, or Firm*—Shumaker, Sieffert, P.A.

(57) ABSTRACT

Techniques are described for synchronizing state information between a plurality of control units. A router, for example, is described that includes a primary control unit and a standby control unit. The primary control unit maintains router resources to ensure operation of the router. To ensure operation, the primary control unit receives state information from the router resources and maintains the state information for consumers, i.e. router resources that require or "consume" state information. Prior to updating the consumers with the state information, the primary control unit synchronizes the state information with the standby control unit. In the event the primary control unit fails, the standby control unit assumes control of the router resources. Upon assuming control, the standby control unit resumes updating the consumers with state information without having to "relearn" state information, e.g., by way of power cycling the router resources to a known state.

22 Claims, 6 Drawing Sheets

U.S. PATENT DOCUMENTS

| | | | |
|---|---|---|---|
| 2003/0217096 A1* | 11/2003 | McKelvie et al. | 709/202 |
| 2004/0034871 A1 | 2/2004 | Lu et al. | |
| 2004/0073646 A1* | 4/2004 | Cho et al. | 709/223 |
| 2004/0073831 A1* | 4/2004 | Yanai et al. | 714/7 |
| 2004/0078619 A1* | 4/2004 | Vasavada | 714/4 |
| 2004/0078625 A1* | 4/2004 | Rampuria et al. | 714/4 |
| 2004/0199808 A1* | 10/2004 | Freimuth et al. | 714/4 |
| 2005/0257213 A1 | 11/2005 | Chu et al. | |

* cited by examiner

SYNCHRONIZING STATE INFORMATION BETWEEN CONTROL UNITS

TECHNICAL FIELD

The invention relates to computing environments and, more particularly, to managing the state information within a computer network.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, maintain tables of information that describe routes through the network. A "route" can generally be defined as a path between two locations on the network. Upon receiving an incoming data packet, the router examines destination information within the packet to identify the destination for the packet. Based on the destination, the router forwards the packet in accordance with the routing table.

The physical connection between devices within the network is generally referred to as a link. A router uses interface cards (IFCs) for receiving and sending data packets via network links. These IFCs are installed in ports known as interfaces and are configured using interface configurations.

Generally, a router maintains state information. For example, a router may maintain state information representing the current state of the interfaces between the router and the network. Such state information may include information representing the state of one or more IFCs, such as the current configuration of the IFCs. As additional examples, a router may maintain state information representing the state of one or more forwarding engines, one or more routing engines, or other resources within the router.

In particular, a process operating within a router may maintain the state information and communicate changes to the state information to various other processes or components within the router. These other processes or components are sometimes referred to as "consumers," because they receive and utilize the state information maintained by the operating system. These consumers make use of the state information when performing their various functions.

As the complexity of conventional networks has increased in recent years, management of the state information within a router or other network device has likewise become a significant challenge. Some existing methods for managing state information involve caching the information within the operating system, and issuing state change notification messages to software modules executing within the router. In response, the software modules retrieve the state information from the operating system.

These conventional methods may be adequate if the rate of state change is relatively low. When the rate of state change increases, however, the rate of generation of state change messages may exceed the capacity of the consumers to receive and process the state information. In addition, the generation of state change messages may exceed the capacity of the communication channel between the sender and the consumer to carry messages, and may exceed the capacity of the sender to store messages.

To further compound the problem, routers are increasing in complexity. For example, some conventional routers may include a primary control unit and one or more standby control units, all of which may require state information. In the event that the primary control unit fails, one of the standby control units assumes control of the routing resources to continue operation of the router. The process of switching control of routing functions between the primary and standby control units is often referred to as failover. State information managed by an operating system executing on the primary control unit may be required by the standby control unit to assume control and continue operation of the router resources. However, once the primary control unit fails, some or all of the state information managed by the primary operating system may be lost. In some instances, to assume proper control and ensure operation, the standby control unit is forced to "relearn" the lost state information from each resource, e.g., by power cycling the router resources to a known state.

SUMMARY

In general, the invention is directed to techniques for synchronizing state information within a computing device having multiple control units, e.g., a primary control unit and at least on standby control unit. For purposes of example, the principles of the invention are described in reference to a network router. The invention, however, is not so limited and may be applied to other devices.

In accordance with the principles of the invention, the router includes a primary control unit and a standby control unit, both of which execute respective operating systems. Each of the operating systems manages respective state information within a temporally-linked and hierarchically-ordered data structure. In particular, each of the operating systems may support execution of kernel-mode processes, which manage the respective state information. Synchronization of the respective state information is enforced in accordance with a "synchronization gradient" in which updated state information is first synchronized from the primary control unit to the standby control unit before distributing the state information to the consumers. This synchronization gradient ensures that, upon failover, the standby control unit contains state information that is at least as current as the state information provided to all consumers of the state information. Consequently, the standby control unit is able to readily assume responsibility in the event of a failover, and can continue updating the consumers with the state information as necessary. In this manner, the standby control unit may assume control of router resources without needing to "relearn" state information, e.g., by power cycling the router resources to a known state.

The operating system executing within the primary control unit ("primary operating system") allocates objects within the data structure for each consumer that requests state information from the primary operating system. The primary operating system inserts the objects in accordance with the temporally-ordered nature of the data structure. Furthermore, the primary operating system initializes a "commit marker" and a "commit proposal" for each requesting consumer and positions the commit marker and commit proposal along the temporally-linked chain of the allocated objects.

Via a state synchronization software process executing within the standby control unit, the operating system executing within the standby control unit ("standby operating system") receives update messages to update state information within the standby control unit. The primary operating system transmits these update messages to ensure synchronization between the respective state information. The primary operating system, after ensuring synchronization, then transmits update messages to router resources to preserve the synchronization gradient.

In one embodiment, the invention is directed to a method comprising managing state information within a primary control unit and communicating changes to the state information to a standby control unit before communicating the changes to a consumer of the state information.

In another embodiment, the invention is directed to a method comprising maintaining state information within a temporally-ordered data structure, communicating a portion of the state information to a consumer and encoding a commit proposal and a commit marker within the data structure to identify the portion of the state information within the data structure.

In another embodiment, the invention is directed to a system comprising a primary control unit a standby control unit and a consumer, wherein the primary control unit manages state information and communicates changes to the state information to the standby control unit before communicating the changes to the consumer.

In another embodiment, the invention is directed to a system comprising a consumer, a memory to store state information and a control unit to maintain the state information within a temporally-ordered data structure, communicate a portion of the state information to the consumer, and encode a commit proposal and a commit marker within the data structure to identify the portion of the state information within the data structure.

In another embodiment, the invention is directed to a computer-readable medium containing instructions. The instructions cause a primary control unit to manage state information stored within the primary control unit and communicate changes to the state information in accordance with an order that requires the changes to be communicated to a standby control unit of the device before communicating the changes to a consumer of the state information operating within the device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
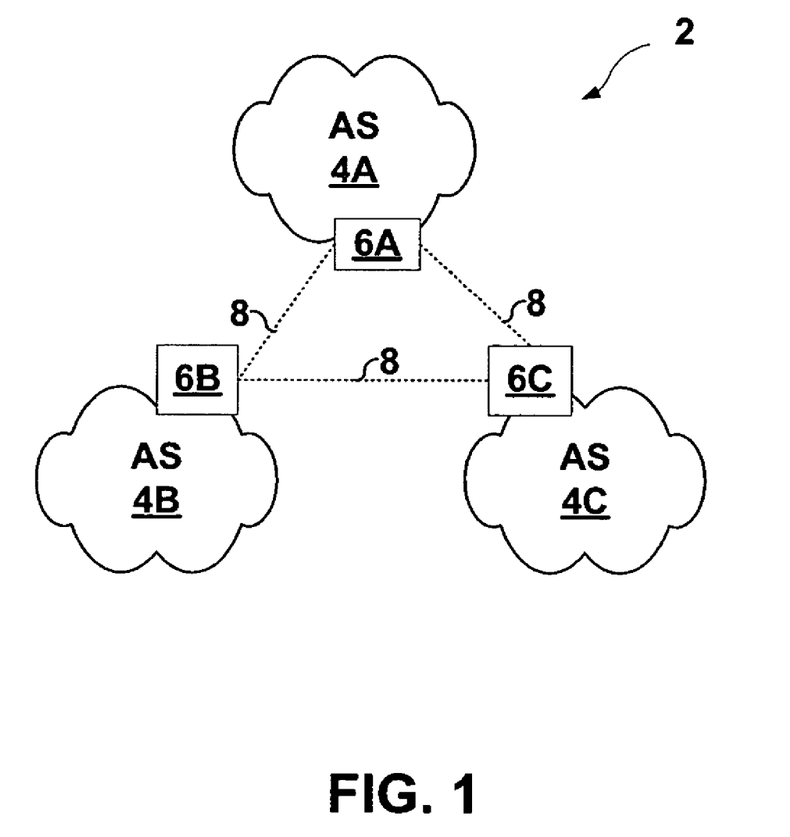
FIG. 1 illustrates a group of autonomous systems (AS) forming a computer network.

FIG. 1 illustrates an exemplary computing network 2 formed by autonomous systems 4A-4C (herein autonomous systems 4) interconnected via communication links 8. Each of autonomous systems 4 represents an independent administrative domain having a variety of networked resources capable of packet-based communication. For example, autonomous systems 4 may include servers, workstations, network printers and faxes, gateways, routers, and the like. Autonomous systems 4 include routers 6 for sharing routing information and forwarding packets via communication links 8.

Router 6A provides for failover by including a primary control unit as well as one or more standby control units. In the event the primary control unit fails, one of the standby control units assumes control over routing resources and routing functionality generally. Prior to failure, the primary and standby control units synchronize their respective state information to allow the standby control unit to assume control of the router resources without having to relearn state information. For exemplary purposes, the principles of the invention will be described in reference to router 6A. However, any or all of routers 6B-6C may operate in accordance with the techniques described herein.

Router 6A may manage the state information within hierarchically-ordered and temporally-linked data structures. The operating systems executing within the primary and standby control units manage the data structures and inform "consumers" of any change to the state information. Consumers may comprise software processes executing within components of router 6A, such as chassis management processes, configuration management processes, or other processes in router 6A. Additionally, consumers of the state information may comprise hardware components or combinations thereof, such as one or more forwarding engines, interface cards (IFCs), or other hardware.

Encoded within the hierarchically-ordered and temporally-linked data structure are commit markers and commit proposals that are used to track the distribution of the state data to the various consumers within the router. In particular, the operating systems executing on the primary and standby control units maintain a commit marker and a commit proposal to track the consumption of state information for each consumer associated with a shared router resource. A shared router resource, as referred to herein, is any router resource, such as a forwarding component, that is shared by both the primary control unit and the one or more of the standby control units.

The commit marker is used to mark the last state change received by the shared consumer, while the commit proposal is used to mark a more recent state change that the shared consumer has not yet received. Consequently, the commit marker and commit proposal may be a pointer, status bit, or other data structure capable of marking a location within the hierarchically-ordered and temporally-linked data structure.

By encoding the commit markers and commit proposals within the data structure, the standby control unit can precisely determine the extent to which consumers have been updated with state information in the event of a failover. As a result, the standby control unit need only update each consumer with a limited amount of the state information that is bounded by its respective commit markers and commit protocols encoded within the state information data structure. For illustration purposes, the shared consumer is discussed in reference to a forwarding component. However, the invention is not limited in that respect.

During normal operation, in the event the state information changes, the primary operating system of router 6A synchronizes state information with operating systems executing on the one or more standby control units (referred to herein as "standby operating systems") of the router. Specifically, the primary operating system replicates the state changes and transmits the state change in message form to the standby operating systems. The standby operating systems receive the message and update their corresponding data structure to record the state changes.

Upon recording the state changes, the standby operating systems may transmit an acknowledgement to the primary operating system to indicate successful state information synchronization. The primary operating system may transmit additional state change messages to the consumers. In this manner, router 6A enforces the requirement that the standby operating systems are updated with state information changes before the consumers and, therefore, can readily assume routing and state management functionality if needed. In this regard, router 6A can be viewed as maintaining a "synchronization gradient" such that the primary control unit receives state changes first, followed by the standby control units, and followed by the router components. This synchronization gradient ensures that upon failover, the standby control unit contains enough state information to assume control of the router resources, and more particularly, the shared router resources, e.g., the forwarding component, without having to relearn any state information.

In response to the state change messages, the consumers issue requests to retrieve the updated state information. When the primary operating system receives such a request, the primary operating system traverses the hierarchically-ordered and temporally-linked data structure and issues state change messages to the requesting consumers. The primary operating system then updates the respective commit markers and commit proposals associated with the requesting shared consumers to reflect transmission of the state changes. The primary operating system again synchronizes state information with the one or more standby operating systems so that the commit markers and commit proposals within the state information maintained by the operating systems are uniform.

In this manner, one of the standby control units may assume control of the router, and can deterministically identify the state information of which each consumer has already been informed, i.e., consumed. As a result, the standby control units may need only update the consumers with limited amount of state information, and need not rely on relearning state information from the resources of router 6A.

Figure 2:
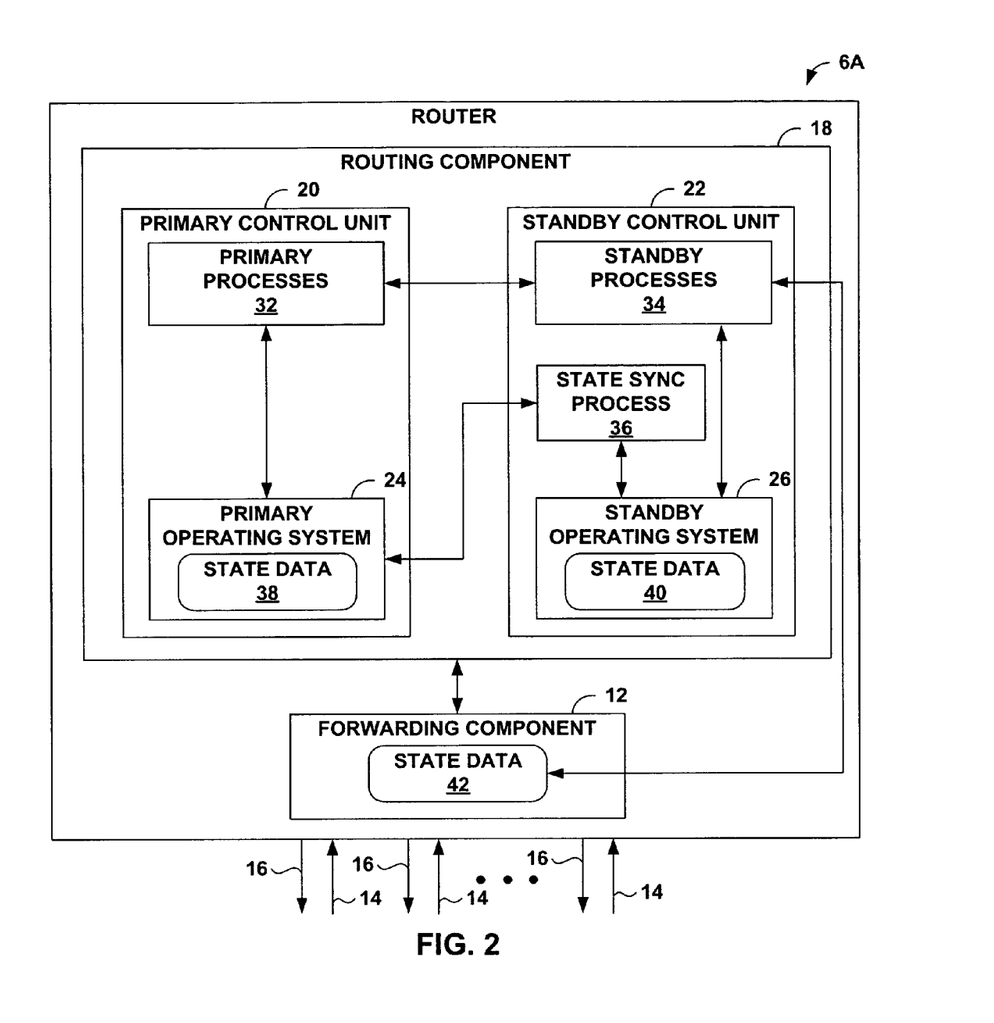
FIG. 2 is a block diagram illustrating an example router consistent with the principles of the invention.

FIG. 2 is a block diagram illustrating an example embodiment of router 6A (FIG. 1) consistent with the principles of the invention. In the exemplary embodiment, router 6A includes a forwarding component 12 for sending and receiving packets using network links 14 and 16. Forwarding component 12 typically includes interface cards (not shown) to send and receive the packets. Routing component 18 receives inbound packets from network links 14 via the interface cards, extracts information from the received packets and forwards the packets on network links 16 via the interface cards based on the extracted information.

Routing component 18 includes a primary control unit 20 and a standby control unit 22. Primary control unit 20 and standby control unit 22 may be substantially similar in both hardware and software aspects. For example, both primary control unit 20 and standby control unit 22 may comprise similar combinations of programmable processors. Moreover, as illustrated in FIG. 2, both primary control unit 20 and standby control unit 22 may execute similar software processes, such as primary operating systems 24, standby operating system 26, primary processes 28 and standby processes 28.

Primary operating system 24 executing on primary control unit 20 may provide a multi-tasking operating environment for execution of a number of software processes, such as primary processes 32. In like manner, standby operating system 26 executing on standby control unit 22 may also provide a multi-tasking operating environment for execution of a number of similar software processes, such as standby processes 34. Standby operating system 26 also provides an environment for execution of state synchronization process 36. An exemplary operating system capable of this is FreeBSD, which is an advanced UNIX operating system that is compatible with a number of programmable processors.

Primary and standby processes 32 and 34, respectively, may both include similar software processes, such as routing protocols daemons, device control daemons, user interface processes, chassis management daemons, and the like. In general, these software processes perform a number of tasks to ensure proper operation of router 6A. For example, routing protocols daemons may implement protocols for exchanging route information with the other routing devices, and perform route resolution to maintain routing information that reflects the topology of a network.

Both primary operating system 24 and standby operating system 26 maintain state information as state data 38 and 40, respectively. A portion of state data 38 and 40 may, for example, represent the current state of the interface between router 6A and the network, which may include the current configuration of forwarding component 12. State data 38 and 40 may comprise hierarchically-ordered and temporally-linked data structures. State data 38 and 40 may be stored in memory, such as RAM, located on respective control units 20, 22 or external to respective control units 20, 22.

Forwarding component 12 may also maintain state information as state data 42. State data 42 may, for example, represent the current state of field replaceable units, such as interface cards, encryption cards, accounting service cards, and the like. Again, state data 42 may be stored in memory, such as RAM, located within or external to forwarding component 12.

At any one time, only one of primary control unit 20 and standby control unit 22 communicates with a shared router resource, e.g., forwarding component 12. For illustration purposes, primary control unit 20 maintains control of forwarding component 12. Primary operating system 24 receives event messages indicative of a change in the state of the shared resource, e.g., forwarding component 12. When primary operating system 24 receives an event message, primary operating system 24 updates state data 38 by reconfiguring the data structure and updating the data stored within the data structure. In addition to updating the data based on the change of state, primary operating system 24 may add, delete or move commit markers and/or commit proposals to various positions within the data structure in the event that the event message relates to the state of a shared routing resources, e.g., forwarding component 12.

Primary operating system 24 then replicates the state change by transmitting the state information in message form to state synchronization process 36 executing on standby control unit 22. State synchronization process 36 extracts the state information and transmits the state information to standby operating system 26. Standby operating system 26 receives this state change and updates state data 40 in accordance with the state change. In some embodiments, standby operating system 26 may support kernel-mode processes that update state data 40. Similar to primary operating system 24, standby operating system 26 may reconfigure and update the data structures of state data 40 based on the state information.

Standby operating system 26 may also add, delete or move commit markers and/or commit proposals to various positions within these data structures. After being updated, state data 40 is substantially similar to state data 38. In other words, state data 40 and state data 38 are synchronized. Standby operating system 26 transmits an acknowledgement to primary operating system 24 via state synchronization process 36 to indicate this synchronized state. In this manner, state synchronization process 36 provides an interface between primary operating system 20 and standby operating system 22 that allows for the synchronization of state information.

Upon receiving the acknowledgement indicating the synchronized state, primary operating system 24 issues alert messages to various consumers indicating that the state of router 6A has changed. For example, primary operating system 24 may issue alert messages to interface cards included within forwarding component 12 to indicate a change in state data 38. In response, primary operating system 24 receives requests from the consumers for state information. Primary operating system 24 services each request by traversing the hierarchically-ordered and temporally-linked data structure of state data 38 and issuing update messages to the requesting consumer. Primary operating system 24 generates the update messages to contain state information that the consumer has not already received based on the respective commit proposal and commit marker for the consumer. Upon updating the consumer, primary operating system 24 may alter state data 38 and, more particularly, move the respective commit marker and commit proposal within the data structure of state data 38 to reflect the update.

Since, state data 38 and state data 40 are to remain synchronous, primary operating system 26 again transmits state changes in message form to standby operating system 28 via state synchronization process 36. Standby operating system 28 again updates state data 40 to be substantially similar to, i.e., synchronized with, state data 38. In particular, standby operating system 28 moves the respective commit marker and commit proposal of state data 40 to mirror state data 38 and reflect that the particular consumer has been updated. Standby operating system 26 transmits another acknowledgement to primary operating system 24 via state synchronization process 36 to indicate successful synchronization of state data 40.

Synchronization of state data 38 and state data 40 continues in this manner until failover occurs. Once failover occurs, primary control unit 20 no longer issues state change messages and standby control unit 22 assumes control over shared resources, such as forwarding component 12. If failover occurs while primary control unit 20 is updating one or more shared resources, standby operating system 26 resume updating the resources. In particular, standby operating system 26 uses the commit markers and commit proposals stored and synchronized within state data 40 to update the shared resources, e.g., forwarding component 12.

For example, standby operating system 26 traverses the hierarchically-ordered and temporally-linked data structures of state data 40 until a commit marker corresponding to forwarding component 12 is reached. Once the commit marker is reached, standby operating system 26 begins issuing state change messages to forwarding component 12. Forwarding component 12 may receive redundant state change messages if primary operating system 24 sent the same state change message but failed prior to receiving an acknowledgement from forwarding component 12. In this case, forwarding component 12 ignores the redundant state change message.

In this manner, standby control unit 22 maintains state data 40 that is synchronous with state data 38 of primary control unit 20. Therefore, standby control unit 22 may facilitate failover by assuming control without requiring standby control unit 22 to relearn the state information, e.g., by resetting forwarding component 12. Moreover, standby control unit 22 need only update the consumers with regard to a limited amount of the state information that is bounded by their respective commit markers and commit protocols encoded within the state information data structure.

To further facilitate failover, standby processes 34 may communicate with forwarding component 12 to learn state data 42 prior to failover. Standby processes 34 may then maintain current information regarding forwarding component 12 while primary control unit 20 is in control of forwarding component 12. Thus, in the event of failover, standby processes 34 are prepared to assume control without having to establish communication with forwarding component 12.

As described, in the event of failover, standby control unit 22 assumes the role of primary control unit 20. Primary control unit 20 may, after being reset, return to an operational status and assume the role of standby control unit 22. In this case, primary control unit 20 initiates a state synchronization process (not shown), similar to state synchronization process 36, to synchronize state data 38 with state data 40 in the manner described above.

Each of primary control unit 20 and standby control unit 22 may operate according to executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. The functions of router 6A may be implemented by executing the instructions of the computer-readable medium with one or more processors, discrete hardware circuitry, firmware, software executing on a programmable processor, or combinations thereof.

FIGS. 3A-3F are block diagrams illustrating an example hierarchically-ordered and temporally-linked data structure of state data 38 for maintaining state information. As illustrated, state information may be stored in the data structure of state data 38 within multiple objects 44. Objects 44 may store information corresponding to routes, firewalls, interface cards, and the like. Objects 44 are hierarchically related by pointers 52, represented by solid lines between the objects. Furthermore, objects 44 are also temporally-linked by temporal pointers 46, represented on FIGS. 3A-3F by dotted lines between the objects. Both hierarchical pointers 52 and temporal pointers 46 aid primary operating system 20 by facilitating ordered access to state information stored within objects 44.

Figure 3A:
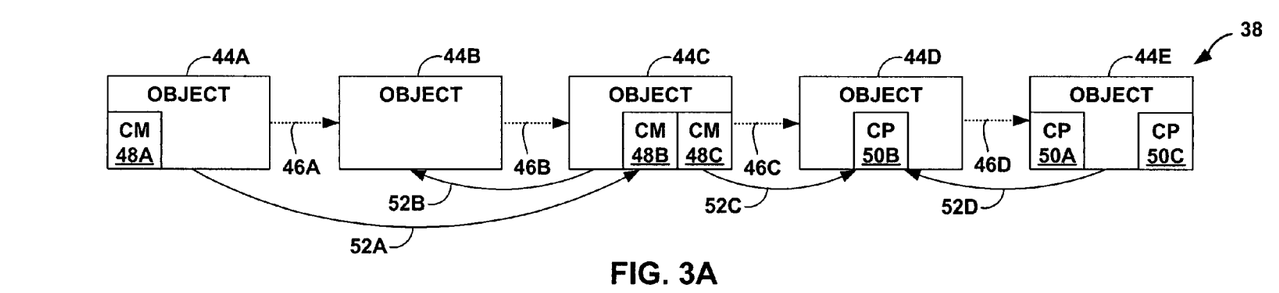
FIG. 3 are block diagrams illustrating an example data structure for maintaining state information.

Initially, primary operating system 24 maintains state information in the form of state data 38, as illustrated in FIG. 3A. Standby operating system 26 also maintains state data 40 (not shown in FIGS. 3A-3F), which is substantially similar to state data 38, as illustrated in FIG. 3A. For illustration purposes, primary operating system 24 associates commit marker 48A and commit proposal 50A with forwarding component 12. Commit proposals 48B, 48C and commit markers 50B, 50C correspond to other consumers associated with shared router resource.

In the example of FIG. 3A, commit marker 48A marks object 44A as holding the last state change issued to forwarding component 12. Commit proposal 50A, however, marks object 44E as holding the most recent, in temporal relation, state information that forwarding component 12 requires, i.e., has yet to be informed. Accordingly, primary operating system 24 issues an alert message to forwarding component 12 to communicate the state information associated with object 44A. Primary operating system 24 may issue further alert messages to indicate to the consumers associated with commit marker/proposal pairs 48B, 50B and 48C, 50C that state updates exist.

Figure 3B:
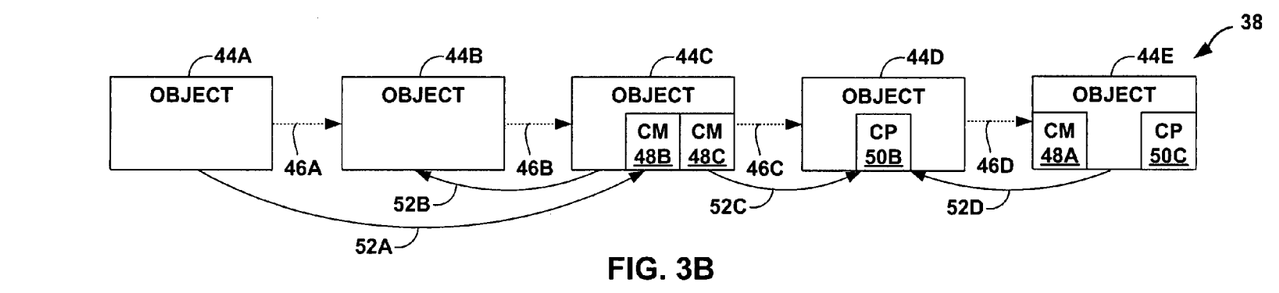

Primary operating system 24 may receive a request for state information stored within objects 44 from any of the consumers associated with commit markers and proposals 48, 50 respectively. In particular, FIG. 3B illustrates the result of updating forwarding component 12 with state information. After sending the state information stored in objects 44A-44E, primary operating system 24 updates commit marker 48A and commit proposal 50A once forwarding component 12 acknowledges receiving the state information marked by commit proposal 50A. Primary operating system 24 moves commit marker 48A to the location of commit proposal 50A to indicate that object 44E now stores the most recent state information transmitted to forwarding component 12. Since forwarding component 12 received all the state information stored in objects 44, primary operating system 24 does not assign commit proposal 50A.

Figure 3C:
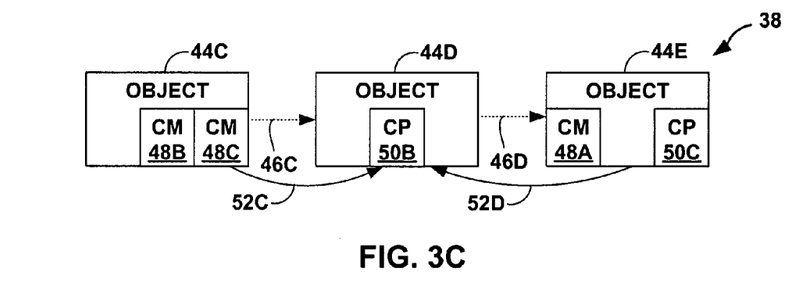

Upon updating commit marker 48A and commit proposal 50A, primary operating system 24 deletes objects 44A and 44B, as illustrated in FIG. 3C. Primary operating system 24 may delete objects 44A and 44B since neither of these objects include commit markers or commit proposals and forwarding component 12 has successfully been updated with state information stored within objects 44A and 44B. Primary operating system 24 then transmits a state change message indicating the acknowledgement by forwarding component 12 of commit proposal 50A.

Standby operating system 26 performs state changes similar to those performed by primary operating system 24 described above. Standby operating system 26 moves a commit marker, similar to commit marker 48A, to the position of a commit proposal, similar to commit proposal 50A, and deletes objects within state data 40 similar to objects 44A and 44B. Standby operating system 26 deletes objects by walking the temporal path of data structures within state data 40. Starting at the commit marker, positioned similar to commit marker 48A shown in FIG. 3A, standby operating system 26 removes the commit marker, traverses the temporal link to the next object and deletes the previous object. The process is repeated until standby operating system 26 reaches the commit proposal mirroring commit proposal 50A, however only those objects without commit proposal or commit markers and not proceeded by objects including commit proposal and commit markers are deleted. Standby operating system 26 updates the commit marker associated with forwarding component 12 and transmits an acknowledgement to indicate state synchronization.

Figure 3D:
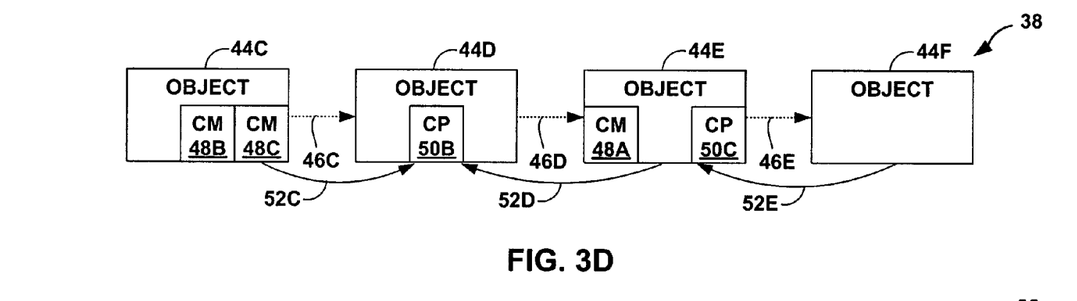
Figure 3E:
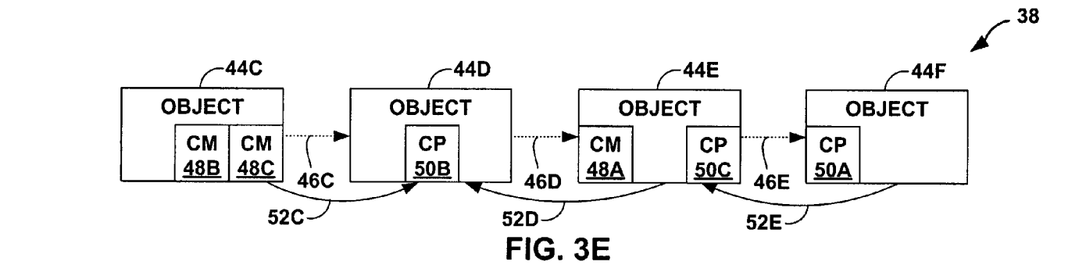

During the course of updating forwarding component 12, primary operating system 24 may receive state changes from primary processes 32. Primary operating system 24 then updates state data 38 to reflect these changes by adding object 44F, which is linked to object 44E by temporal pointer 46E, as illustrated in FIG. 3D. Hierarchical pointer 52E may also be added to link objects 44F to objects 44E. Object 44F may store state information pertinent to forwarding component 12 and primary operating system 24 indicates this by adding commit proposal 50A to object 44F, as illustrated in FIG. 3E.

Figure 3F:
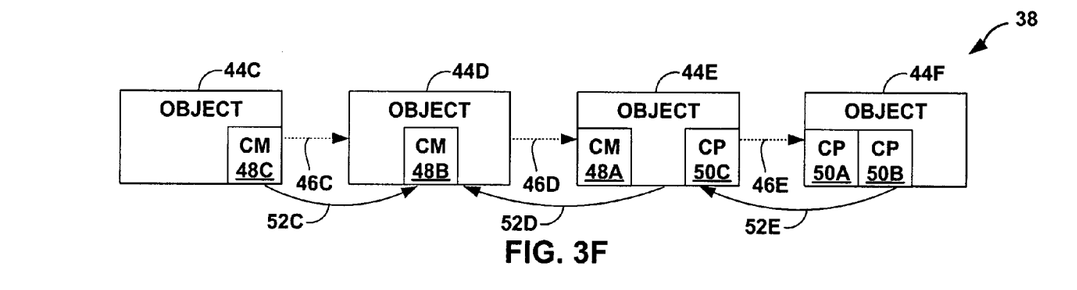

Primary operating system 26 may then proceed through the synchronization process to synchronize state data 38 with state data 40, as described above. In similar fashion to the process discussed above in context of commit marker 48A and commit proposal 50A, primary operating system move commit marker 48B in response to updating another shared router resource with state information stored within objects 44C and 44D, as illustrated in FIG. 3F. Again, as described above, primary operating system 24 and standby operating system 26 synchronize state information following each update to state data 38.

In this manner, router 6A, in accordance with the principles of the invention, maintains synchronized state information between primary control unit 20 and standby control unit 24. By utilizing a hierarchically-ordered and temporally-linked data structure that incorporates commit proposal and commit markers, primary operating system 24 and standby operating system 26 manage and synchronize state changes associated with shared router resources. As a result, in the event of failover, standby control unit 22 can precisely determine the extent to which consumers within router 6A have been updated with state information. Consequently, standby control unit 22 need only update the consumers with regard to a limited amount of the state information, i.e., the state information that is bounded by their respective commit markers and commit protocols encoded within the state information data structure.

Figure 4:
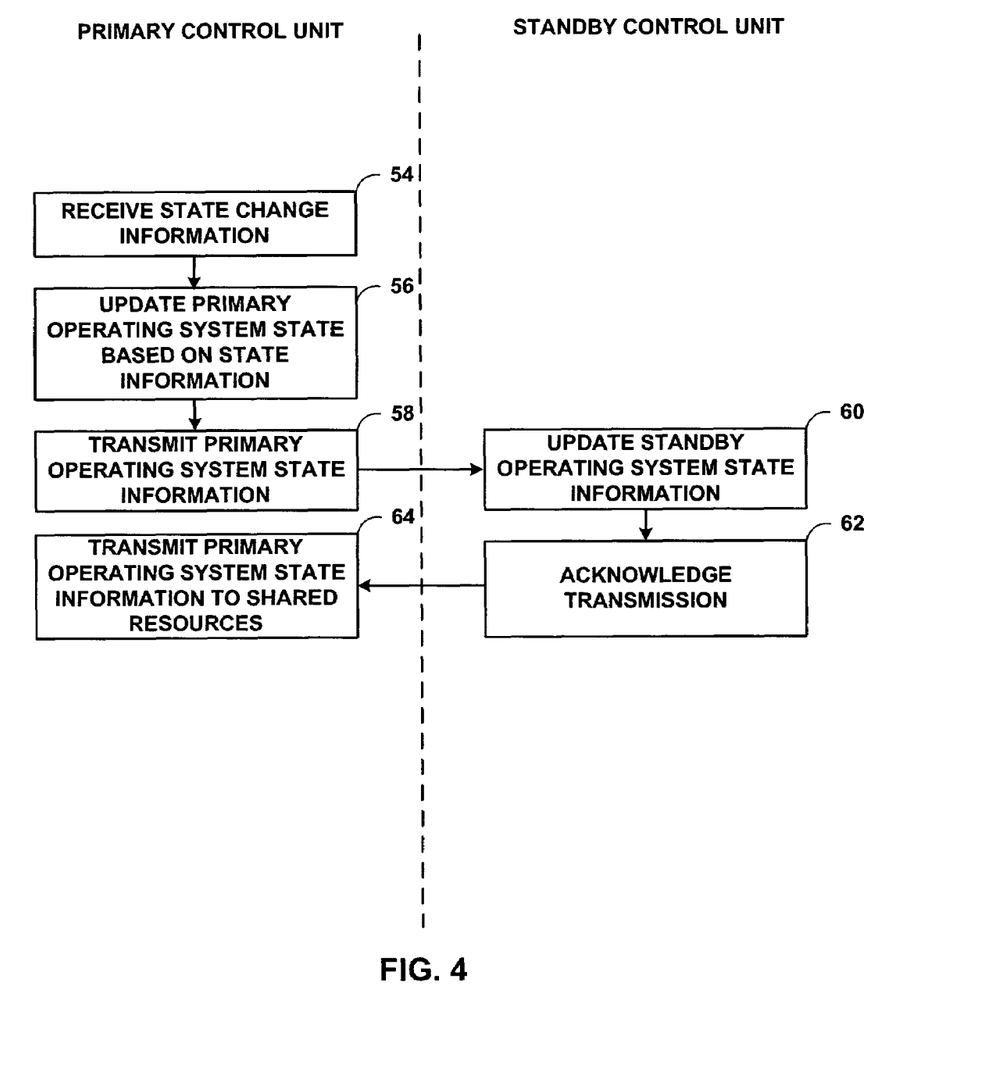
FIG. 4 is a flowchart illustrating exemplary operation of a router in accordance with the principles of the invention.

FIG. 4 is a flowchart illustrating exemplary operation of router 6A (FIGS. 1-2) to synchronize and process state changes in accordance with the principles of the invention. Router 6A and, more particularly, primary operating system 24 receive information regarding changes to the state of the network or resources with router 6A (54). As one example, primary operating system 24 receives state information from primary processes 32. The state information may define changes to the network topology, such as the addition of network routes.

Primary operating system 24 updates state data 38 to reflect the changes in state of network 2 (56). State data 38 and 40 include hierarchically-ordered and temporally-linked data structures, as illustrated in reference to FIG. 3. Primary operating system 24 updates state data 38 by adding and/or removing objects and adding, deleting or moving commit markers and commit proposals, as described below in more detail.

In accordance with the principles of the invention, state data 40 is synchronized with state data 38. In particular, primary operating system 24 replicates the state information of state data 38 and transmits the state information to standby operating system 26 via state synchronization process 36 (58). Upon receiving the updates, standby operating system 26 processes the state information and executes the necessary changes to synchronize state data 40 (60). Standby operating system 36 then transmits an acknowledgement to primary operating system 24 via state synchronization process 36 (62).

Primary operating system 24 receives the acknowledgment and proceeds to transmit the updated state information to shared router resources, such as forwarding component 12 (64). In particular, primary control unit 24 issue alert messages to indicate to the consumers that state updates exist. Upon receiving requests from the consumers, primary operating system 24 transmits the updated state information based upon the locations of the respective commit proposals and commit markers associated with the consumers.

The consumers associated with shared router resources receive the updated state information and make the necessary changes to their respective state data. For example, forwarding component 12 may receive updated state information from primary operating system 24 and update state data 42.

As illustrated in FIG. 4, router 6A synchronizes and updates state information in accordance with a defined "synchronization gradient," whereby primary operating system 24 receives state changes, followed by standby operating system 26 and then forwarding component 12 and other shared resources. This synchronization gradient ensures that upon failover, standby control unit 22 contains state information that is at least as current as the state information provided to all consumers of state information. Consequently, standby control unit 22 is able to readily assume responsibility in the event of a failover, and can continue updating the consumers with the state information as necessary.

Figure 5:
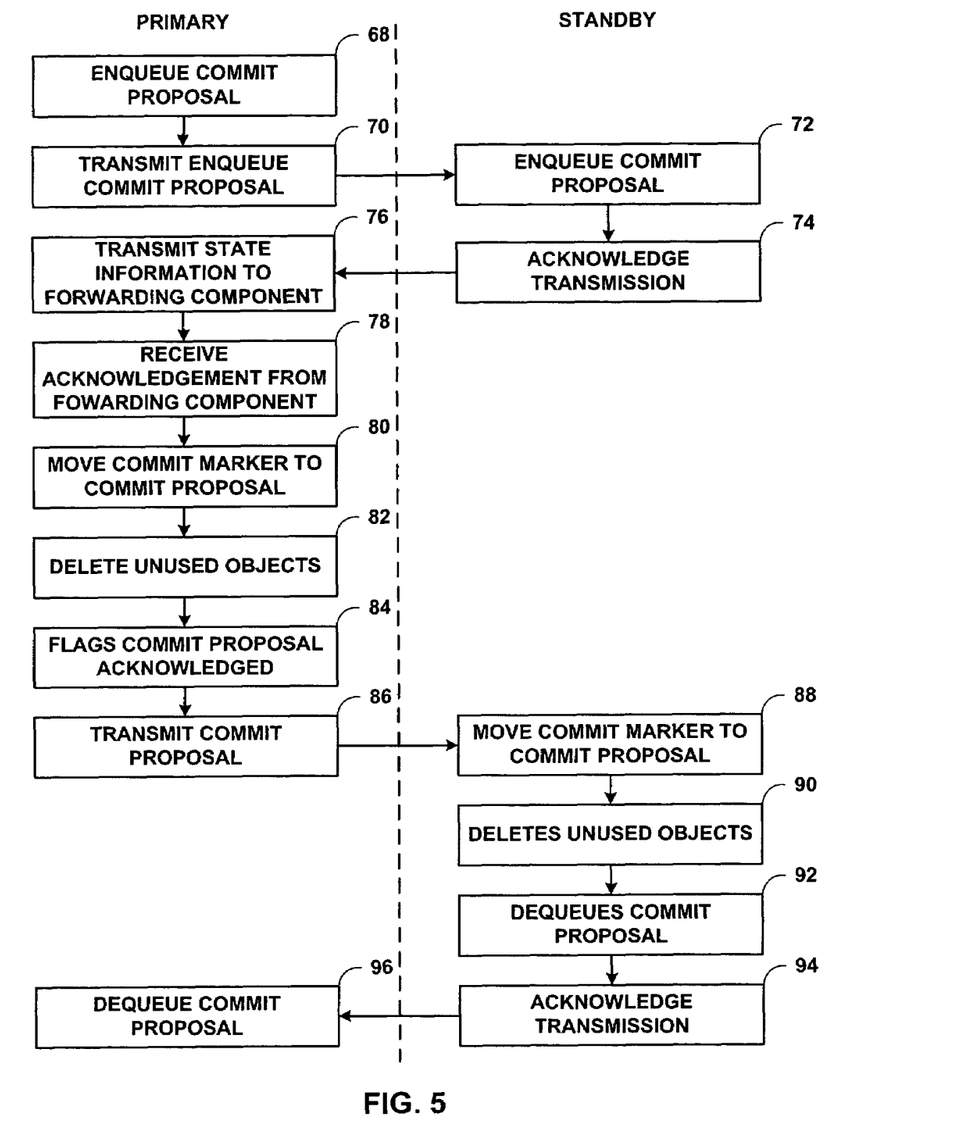
FIG. 5 is a flowchart illustrating exemplary manipulation of a data structure included within state data in accordance with the principles of the invention.

FIG. 5 is a flowchart that further illustrates the manipulation of the hierarchically-ordered and temporally-linked data structures of state data 38 and 40 throughout the synchronization process of FIG. 4.

In some embodiments, primary operating system 24 may, periodically enqueue a commit proposal for a consumer when one is not present on the temporal chain, i.e., when the consumer has been updated with all of the state information of the temporal chain (68). For example, as illustrated in FIG. 3B, commit proposal 50A is not present for a consumer since the associated commit marker for the consumer, commit marker 48A marks the last object of the temporal chain. Thus, no commit proposal can be inserted. However, once further objects are added, as illustrated in FIG. 3D, commit proposal 50A may be enqueued and positioned to mark object 44F, as illustrated in FIG. 3E.

After initializing the data structures and positioning the commit proposal at the end of the temporal chain, primary operating system 24 flags the commit proposal. Primary operating system 24 may flag the commit proposal by indicating to the consumer of the associated commit proposal via shared memory, flag messages, and the like that the commit proposal has been updated. The flag indicates to standby operating system 26 and consumers associated with forwarding component 12 that the status of the commit proposal has changed. Primary operating system 24 then transmits the enqueue state update to standby operating system 26 via state synchronization process 36 (70).

Standby operating system 26 receives the transmission, enqueues a similar commit proposal (72) and positions the commit proposal at the end of the temporal chain data structure of state data 40. To indicate successful synchronization of state data 40, standby operating system 26 transmits an acknowledgement to primary operating system 24 (74).

Upon receiving the acknowledgement from standby operating system 26, primary operating system 24 sends the state information bounded by the commit proposal and the commit marker to the forwarding component 12 (76). Forwarding component 12 sends an acknowledgement to primary operating system 24 in response to receiving the updated state information. The acknowledgement indicates that forwarding component 12 successfully updated state data 42 in accordance with the updated state information.

Primary operating system 24 receives the acknowledgement, and then moves the commit marker to the position of the commit proposal, both of which are associated with forwarding component 12. For example, primary operating system 24 moves commit marker 48A to the position of commit proposal 50A, as illustrated in FIG. 3B. As illustrated in FIG. 3B, no commit markers or commit proposals mark objects 44A and 44B. Consequently, primary operating system 24 deletes these unused objects of the temporal chain (82).

To maintain the synchronicity between state data 38 and 40, primary operating system 24 flags the commit proposal, i.e., commit proposal 50A, (84) and transmits the commit proposal to standby operating system 26 (86). Standby operating system 26, upon receiving the flagged commit proposal, updates state data 40 by mirroring the actions previously performed by primary operating system 24. In particular, standby operating system 26 moves the commit marker associated with forwarding component 12 to the position of the commit proposal associated with forwarding component 12 (88). Standby operating system 26 further traverses the data structure of state data 40 and deletes any unused objects as described above (90). Standby operating system 26 then dequeues the commit proposal from the temporal chain (92) and transmits an acknowledgement to primary operating system 24 via state synchronization process 36 (94).

Primary operating system 24 receives the acknowledgement from standby operating system 26. The acknowledgement indicates successful synchronization of state data 40 with state data 38. Thus, primary operating system 24 may dequeue the commit proposal from the temporal chain (96).

One or more of the techniques described herein may be partially or wholly executed in software. For example, a computer-readable medium may store or otherwise comprise computer-readable instruction, i.e., program code that can be executed by a processor to carry out one or more of the techniques described above. For example, the computer-readable medium may comprise random access memory (RAM), read-only memory (ROM), non-volatile random access memory (NVRAM), electrically erasable programmable read-only memory (EEPROM), flash memory, magnetic or optical media, or the like.

Various embodiments of the invention have been described. Although described in reference to a router, the techniques may be applied to any device having a plurality of control units. Examples of other devices include switches, gateways, intelligent hubs, firewalls, workstations, file servers, database servers, and computing devices generally. Moreover, although the techniques have been described as elements embodied within a single device, the described elements may be distributed to multiple devices. The term "system" is used herein to generally refer to embodiments of the invention in which the described elements may be embodied within a single network device or distributed within multiple devices. These and other embodiments are within the scope of the following claims.

What is claimed is:

1. A method comprising:
   managing state information within a primary control unit included within a device, wherein the state information comprises information representing a current state of one or more consumers included within the device, wherein managing the state information comprises (i) managing the state information within a temporally-ordered data structure, (ii) utilizing, for each of the consumers, a commit proposal and a commit marker pair within the temporally-ordered data structure to identify a portion of the state information for each of the consumers and (iii) setting, for each of the consumers, the corresponding one of the commit markers to identify a most recent object of the temporally-ordered data structure that has been communicated to and for which an acknowledgement has been received from the respective one of the consumers;
   receiving, with the primary control unit, a change to the state information; prior to communicating the change to the consumers of the state information included within the device, communicating to a standby control unit included within the device the change performed by the primary control unit to the state information to synchronize the state information between the primary and standby control units, wherein communicating the change to the standby control unit comprises (i) replicating the temporally-ordered data structure within the standby control unit and (ii) replicating the commit proposal and the commit marker to the standby control unit, wherein replicating the temporally-ordered data structure comprises communicating a portion of the replicated temporally-ordered data structure that is bounded by the replicated commit proposal and the replicated commit marker to the consumer from the standby control unit in the event the primary control unit fails;

after synchronizing the state information between the primary and standby control units, communicating, with the primary control unit, the change to at least one of the consumers to update consumer state information maintained within the at least one of the consumers in accordance with the portion of state information identified by the respective one of the commit proposal and commit marker pairs of the temporally-ordered data structure, wherein at least one of the consumers comprises a forwarding component of the device;

issuing a communication from the primary control unit to cause the standby control unit to set the replicated commit proposal to identify a most recent object of the replicated temporally-ordered data structure that has not been acknowledged by the consumer; and issuing another communication from the primary control unit to cause the standby control unit to set the replicated commit marker to identify a most recent object of the replicated temporally-ordered data structure that has been communicated to the consumer and for which an acknowledgement has been received from the consumer.

2. The method of claim 1, wherein communicating the change to the state information to the standby control unit comprises communicating the change to the state information in accordance with an order that requires the change to be communicated to the standby control unit prior to communicating the change to the consumer of the state information.

3. The method of claim 1, further comprising setting a flag that indicates to the consumer that the commit proposal has been set.

4. The method of claim 1, further comprising resetting the commit marker to the object identified by the commit proposal in response to receiving the acknowledgement.

5. The method of claim 1, wherein issuing the other communication to cause the standby control unit to set the replicated commit marker further causes the standby control unit to set the replicated commit marker to the object identified by the replicated commit proposal in response to receiving the acknowledgement.

6. The method of claim 1, wherein utilizing the commit marker and the commit proposal further comprises deleting a least recent object of the temporally-ordered data structure that is not bounded by the commit marker and the commit proposal.

7. The method of claim 1, wherein managing the state information comprises storing the state information within a set of objects.

8. The method of claim 7,
wherein the change comprises one of a plurality of changes,
wherein receiving the changes comprises receiving event messages indicating the changes to the state information, and
the method further comprising linking the objects of the data structure in accordance with an order in which the event messages are received to form a temporally-ordered data structure.

9. A device comprising:
a primary control unit;
a standby control unit; and
one or more consumers, wherein at least one of the consumers comprises a forwarding component,
wherein the primary control unit manages state information, receives a change to the state information, communicates the change to the state information to the standby control unit before communicating the changes to the consumers to synchronize the state information between the primary and standby control units, and after synchronizing the state information between the primary and standby control units, communicates the change to at least one of the consumers to update consumer state information maintained within the at least one of the consumers with the change, and
wherein the state information comprises information representing a current state of the consumer included within the device,
wherein the primary control unit further (i) manages the state information within a temporally-ordered data structure, (ii) utilizes, for each of the consumers, a commit proposal and a commit marker pair within the temporally-ordered data structure to identify a portion of the state information for each of the consumers and (iii) setting, for each of the consumers, the corresponding one of the commit markers to identify a most recent object of the temporally-ordered data structure that has been communicated to and for which an acknowledgement has been received from the respective one of the consumers,
wherein the primary control unit also (i) replicates the temporally-ordered data structure within the standby control unit and (ii) replicates the commit proposal and the commit marker to the standby control unit
wherein the primary control unit replicates the commit proposal and the commit marker to the standby control unit and communicates a portion of the replicated temporally-ordered data structure that is bounded by the commit proposal and the commit marker to the consumer from the standby control unit in the event the primary control unit fails,
wherein the primary control unit further, after synchronizing the state information between the primary and standby control units, communicates the change to the at least one of the consumers to update the consumer state information maintained within the at least one of the consumers in accordance with the portion of state information identified by the respective one of the commit proposal and commit marker pairs of the temporally-ordered data structure,
wherein the primary control unit issues a communication that causes the standby control unit to set the replicated commit proposal to identify a most recent object of the temporally-ordered replicated data structure that has not been acknowledged by the consumer, and
wherein the primary control unit issues a another communication that causes the standby control unit to set the replicated commit marker to identify a most recent object of the temporally-ordered replicated data structure that has been communicated to the consumer and for which an acknowledgement has been received from the consumer.

10. The device of claim 9, wherein communicating the change to the state information to the standby control unit comprises communicating the change to the state information in accordance with an order that requires the change to be communicated to the standby control unit prior to communicating the change to the consumer.

11. The device of claim 9, wherein the commit proposal and the commit marker identify the portion of the state information within the data structure that has been communicated to the consumer.

12. The device of claim 9, wherein the primary control unit sets the commit proposal to identify a most recent object of the temporally-ordered data structure that has been communicated to the consumer, and sets the commit marker to identify a most recent object of the temporally-ordered data structure that has been communicated to the consumer and for which an acknowledgement has been received from the consumer.

13. The device of claim 12, wherein the primary control unit sets a flag that indicates to the consumer that the commit proposal has been set.

14. The device of claim 12, wherein the primary control unit further sets the commit marker to the object identified by the commit proposal in response to receiving the acknowledgement.

15. The device of claim 9, wherein the other communication that causes the standby control unit to set the replicated commit marker further causes the standby control unit to set the replicated commit marker to the object identified by the replicated commit proposal in response to receiving the acknowledgement.

16. The device of claim 9, wherein the primary control unit utilizes the commit marker and the commit proposal to delete a least recent object of the temporally ordered data structure that does not include the commit marker and the commit proposal.

17. The device of claim 9,
wherein the change comprises one change of a plurality of changes,
wherein the primary control unit receives event messages indicating the changes to the state information, and links objects of the data structure in accordance with an order in which the event messages are received to form the temporally-ordered data structure.

18. The device of claim 9, wherein the primary control unit manages state information by storing the state information within a set of objects.

19. A computer-readable medium comprising instructions for causing a primary control unit to:
manage state information stored within the primary control unit included within a device, wherein the state information comprises information representing a current state of one or more consumers included within the device, wherein managing the state information comprises (i) managing the state information within a temporally-ordered data structure, (ii) utilizing, for each of the consumers, a commit proposal and a commit marker pair to identify a portion of the state information for each of the consumers and (iii) setting, for each of the consumers, the corresponding one of the commit markers to identify a most recent object of the temporally-ordered data structure that has been communicated to and for which an acknowledgement has been received from the respective one of the consumers;
receive a change to the state information;
communicate the change to the state information in accordance with an order that requires the changes to be communicated to the standby control unit before communicating the changes to the consumers of the state information included within the device such that the state information is synchronized between the primary and standby control units, wherein communicating the change to the standby control unit comprises (i) replicating the temporally-ordered data structure within the standby control unit and (ii) replicating the commit proposal and the commit marker to the standby control unit, wherein replicating the temporally-ordered data structure comprises communicating a portion of the replicated temporally-ordered data structure that is bounded by the replicated commit proposal and the replicated commit marker to the consumer from the standby control unit in the event the primary control unit fails;
after synchronizing the state information between the primary and standby control units, communicate the change to at least one of the consumers to update consumer state information maintained within the at least one of the consumers in accordance with the portion of state information identified by the respective one of the commit proposal and commit marker pairs of the temporally-ordered data structure, wherein at least one of the consumers comprises a forwarding component;
issuing a communication from the primary control unit to cause the standby control unit to set the replicated commit proposal to identify a most recent object of the replicated temporally-ordered data structure that has not been acknowledged by the consumer; and
issuing another communication from the primary control unit to cause the standby control unit to set the replicated commit marker to identify a most recent object of the replicated temporally-ordered data structure that has been communicated to the consumer and for which an acknowledgement has been received from the consumer.

20. The computer-readable medium of claim 19, wherein the instructions cause the primary control unit to:
set the commit proposal to identify a most recent object of the temporally-ordered data structure that has been communicated to the consumer; and
set the commit marker to identify a most recent object of the temporally-ordered data structure that has been communicated to the consumer and for which an acknowledgment has been received from the consumer.

21. The method of claim 1, wherein the device comprises a router.

22. The device of claim 9, wherein the device comprises a router.

* * * * *

UNITED STATES PATENT AND TRADEMARK OFFICE
CERTIFICATE OF CORRECTION

| | | |
|---|---|---|
| PATENT NO. | : 7,739,403 B1 | Page 1 of 1 |
| APPLICATION NO. | : 10/678280 | |
| DATED | : June 15, 2010 | |
| INVENTOR(S) | : Balakrishna et al. | |

It is certified that error appears in the above-identified patent and that said Letters Patent is hereby corrected as shown below:

Column 14, line 50 (claim 9), "issues a another" should read -- issues a --

Column 15, line 28 (claim 16), "object of the temporally ordered" should read -- object of the temporally-ordered --

Signed and Sealed this

Thirteenth Day of November, 2012

David J. Kappos
*Director of the United States Patent and Trademark Office*